United States Patent [19]

Kern

[11] Patent Number: 5,797,540

[45] Date of Patent: Aug. 25, 1998

[54] METHOD OF MAKING A POWER-TRANSMITTING COUPLING

[75] Inventor: Robert D. Kern, Waukesha, Wis.

[73] Assignee: Generac Corporation, Waukesha, Wis.

[21] Appl. No.: 789,695

[22] Filed: Jan. 27, 1997

[51] Int. Cl.$^6$ ................................................ B23P 15/14
[52] U.S. Cl. ........................ 228/182; 29/463; 29/893; 29/893.34
[58] Field of Search ......................... 29/893, 893.34, 29/463; 228/182

[56] References Cited

U.S. PATENT DOCUMENTS 2,931,094  4/1960  Teerlink ........................... 29/893.34
2,963,772  12/1960  Niles, Sr. ............................ 29/463 X
3,429,700  2/1969  Wiegand et al. .................... 29/463 X
4,127,368  11/1978  Langer ............................... 29/463 X Primary Examiner—Kenneth J. Ramsey
Attorney, Agent, or Firm—Jansson, Shupe, Bridge & Munger, Ltd.

[57] ABSTRACT

A method for making a power-transmitting coupling including the steps of forming first and second "half-shell" coupling components, each of which has an edge around the component cavity and also has a number of radially-outwardly-extending projections. The components are supported on a hub in edge-contacting relationship to one another and then such components are joined to one another and to the hub. A new power-transmitting coupling is also disclosed.

10 Claims, 4 Drawing Sheets

METHOD OF MAKING A POWER-TRANSMITTING COUPLING

FIELD OF THE INVENTION

This invention relates generally to machine elements and mechanisms and, more particularly, to rotary-to-rotary mechanical couplings.

BACKGROUND OF THE INVENTION

Transmitting mechanical power often involves a prime mover, e.g., a gasoline or diesel engine, coupled in some way to a driven load. All automobiles (as well as many other types of machines) have some means of transmitting mechanical power from an engine to the driving wheels.

One way of doing so is by using a mechanical transmission of the manual gear-shifting type whereby the engine is coupled to the load, such load being the weight of the vehicle "reflected" through the driving wheels and the transmission to the engine. Another way to transmit mechanical power is through an automatic transmission of the torque-converter type. But these exemplary transmissions all include some device or mechanism, e.g., a manually-operated clutch, to cushion the flow of power as well as to wholly disconnect the engine and the load from one another.

In other types of transmissions which are less well known (at least to the public generally), mechanical power is transmitted through some sort of coupling by which the prime mover and the load are always connected to one another. And such couplings are available in either rigid types or in "cushioned" types, the latter being configured to reduce shock during starting, running and stopping.

A specific type of engine-generator set is an example of a machine in which the prime mover and the load are always connected to one another. Exemplary uses for engine-generator sets include providing standby power for hospitals and providing day-to-day on-site power at remote construction sites.

In one arrangement for transmitting mechanical power from an engine to a generator, the engine output shaft has a transmission member connected to it. Such transmission member has radially-inwardly-extending fingers that may be said to "interdigitate" with radially-outwardly-extending fingers of a coupling connected to the generator shaft. A separate round, resilient plug is placed between each adjacent pair of fingers to absorb shock and vibration as power is being transmitted from the engine to the generator.

Like the transmission member, the coupling is made of a solid block of steel which is "rough-formed" (by casting, for example) to have alternating projections and depressions between such projections. The rough-formed block is then machined to bring the projections and depressions to their finished shapes.

And that is not all of the machining required. The coupling must fit the shaft of a generator and such shaft may be tapered. Therefore, the coupling must also be machined to have an opening sized to receive the shaft and to have a keyway used to prevent relative rotation between the coupling and the shaft.

The rough-formed block is heavy and the finished, machined coupling is nearly as heavy. That is, the coupling contributes to engine load by incrementally increasing the aggregate mass and inertia "seen" by the engine. And such increase in mass necessarily incrementally increases the shock experienced, especially during starting and stopping.

And those are not the only disadvantages of the known coupling. Another is cost. The known coupling has a cost to manufacture which, in view of the invention, is unnecessarily high.

A new method for making a coupling which addresses disadvantages of the prior art methods and which results in a new coupling and a new power transmission incorporating the coupling which better facilitate mechanical power transmission would be an important advance in the art.

OBJECTS OF THE INVENTION

An object of the invention is to provide a new torsional coupling and method for making such coupling which overcome some of the problems and shortcomings of the prior art.

Another object of the invention is to provide a new torsional coupling, the weight of which is reduced as compared to similar prior art couplings.

Another object of the invention is to provide a new torsional coupling, the cost of which is reduced as compared to similar prior art couplings.

Still another object of the invention is to provide a new method for making a torsional coupling wherein the resulting coupling has a weight and cost which, as compared to similar prior art couplings, are reduced.

Another object of the invention is to provide a new method for making a torsional coupling made by welding and which includes little, if any, post-welding machining.

Another object of the invention is to provide a new torsional coupling and method for making such coupling which nevertheless recognize the possibility of some post-welding machining.

Yet another object of the invention is to provide a new torsional coupling which, as compared to similar prior art couplings, imposes less shock on the other drive train components. How these and other objects are accomplished will become more apparent from the following descriptions and from the drawings.

SUMMARY OF THE INVENTION

In general, the new, improved method for making a power-transmitting coupling includes the steps of forming first and second coupling components, supporting the components in surface-contacting relationship to one another and joining the components to one another. The forming step includes shaping the components so that each has a central aperture, an interior cavity and an edge around such cavity. In a more specific aspect of the method, each component has a generally planar body portion having an interior surface and the edges are finished to define a plane substantially parallel to the body portion of that component.

Most preferably, the forming step includes forming the coupling components to be substantially identical to one another. Each component resembles a "half shell" and such components may be used interchangeably when making the coupling. Unlike a coupling of a known type, the new coupling is hollow. And such new coupling is significantly lighter than its predecessor.

In another aspect of the new method, the supporting step includes assembling the components to a drive hub configured to have reduced-area first and second guide portions, one such portion at each end of the hub. And each guide portion terminates in a shoulder. A separate guide portion is inserted through each of the respective apertures of the coupling components and the half-shell components are urged toward one another until their edges contact one another.

Another aspect of the new method involves certain dimensional relationships. The hub shoulders are spaced by a first dimension as measured along or parallel to the hub central axis. As to each component, the interior surface of its body portion and the plane defined by the component edge are spaced by what is termed a "depth dimension." In a preferred method, the first dimension is substantially equal to the total of the depth dimensions of the two half-shell components. And in a highly preferred method, the depth dimensions of the components are substantially equal to one another.

When the components are supported with respect to the hub and in a relationship to one another such that the components contact one another at the edges, the edges form a weld path. The joining step includes welding along the weld path and in a more specific aspect, also includes welding the components to the drive hub.

Even more specifically, disparate types of welding are used to weld along the weld path (thereby joining the components to one another) and to weld the components to the drive hub. Welding along the weld path is by tungsten inert gas (TIG) welding while welding the components to the drive hub is by metal inert gas (MIG) welding.

It has been discovered that the surface finish resulting from TIG welding is sufficiently smooth to substantially avoid abrading or otherwise damaging the resilient ovoid devices which are used with the coupling. As described below, such devices are interposed between the coupling and a transmission member with which the coupling coacts to transmit mechanical power.

A new power-transmitting coupling includes a drive hub having a central axis and first and second coupling components mounted on the hub. Each component is shaped to have an interior cavity and an edge around the cavity. The components are attached to one another in edge-abutting relationship and such components are also attached to the hub.

In a specific configuration and application, the components have a number of projections extending radially-outwardly, eight projections in an exemplary embodiment. The projections are equally spaced from one another and each pair of projections defines a notch therebetween. The coupling is mounted concentric with a ring-like transmission member having an equal number of fingers extending radially inwardly. The arc width of each finger and each projection is less than the arc width of a notch.

A resilient ovoid device (sometimes referred to as a "puck") is lodged between each finger of the transmission member and each projection of the coupling and contacts the TIG-applied weld material. In that way, mechanical power transmitted from the transmission member to the coupling is cushioned when accelerating, running and retarding. To put it in other words, there is no metal-to-metal contact between the transmission member and the coupling. A specific ovoid device has a marker used to properly orient the device with respect to the coupling when the coupling, devices and transmission member are being assembled.

Other aspects of the invention are set forth in the following detailed description and in the drawings.

DETAILED DESCRIPTIONS OF PREFERRED EMBODIMENTS

Figure 1:
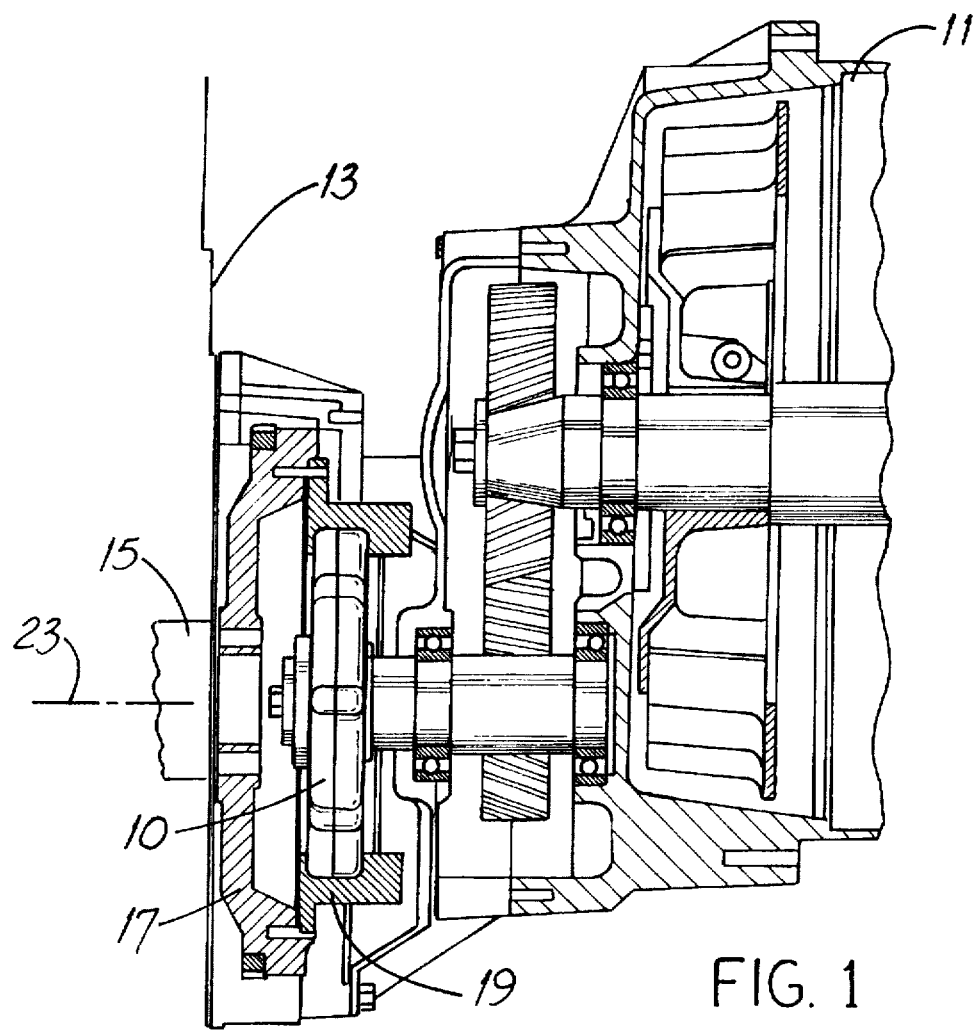
FIG. 1 is an elevation view, partly in section and partly in full representation, showing an exemplary application for the new coupling, i.e., a prime mover driving an electric generator.
Figure 5:
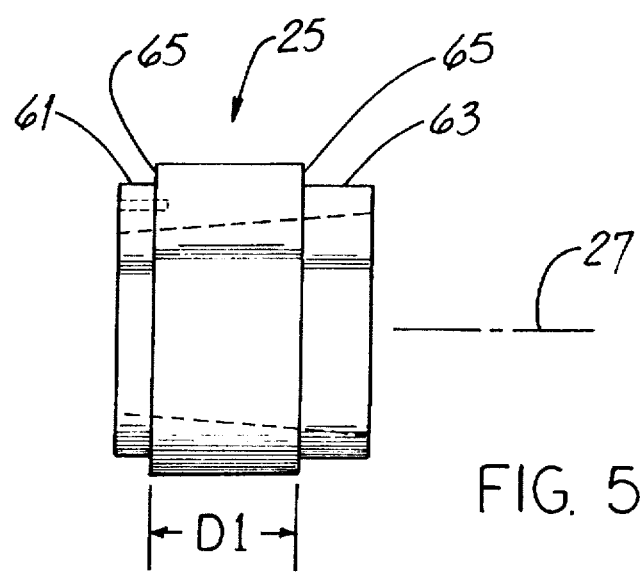
FIG. 5 is an elevation view of the drive hub portion of the new coupling. Certain surfaces are shown in dashed outline.
Figure 2:
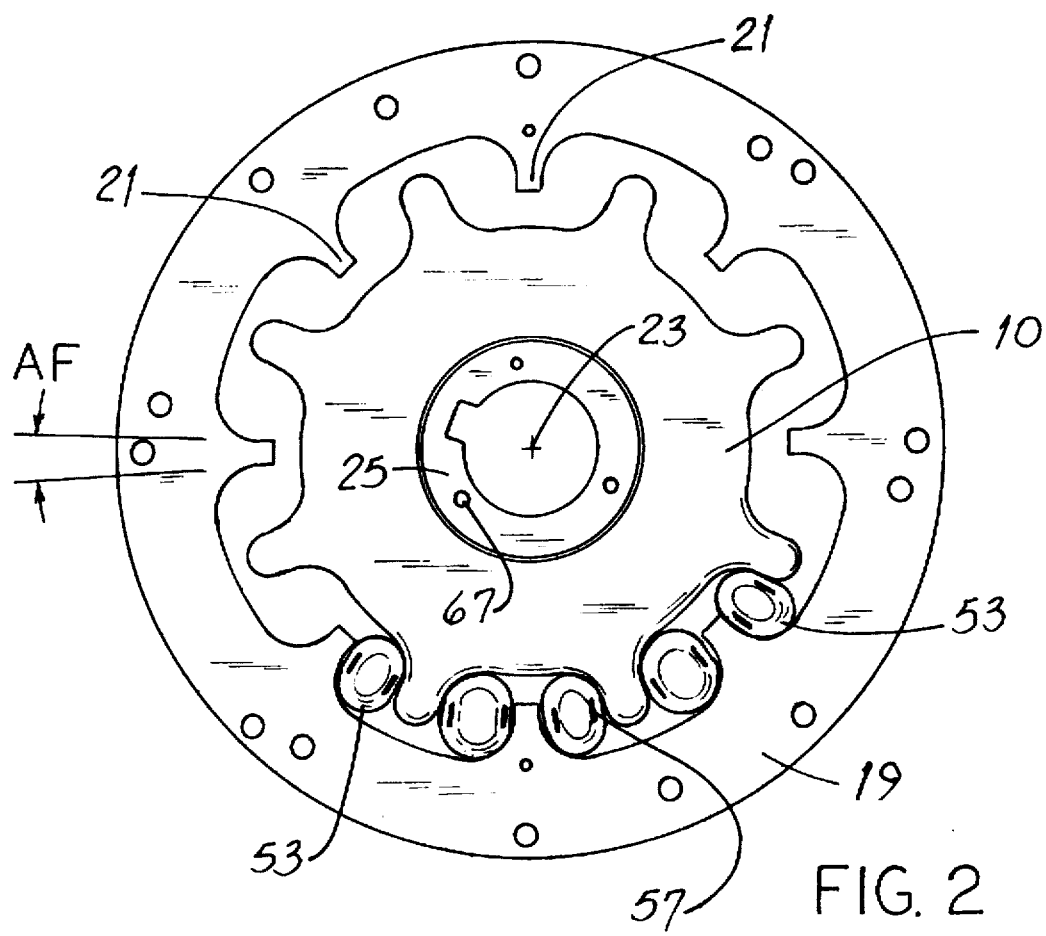
FIG. 2 is an elevation view of the new coupling shown in conjunction with a transmission member used to transmit mechanical power to the coupling.

Before describing the new power-transmitting coupling 10 and method for making such coupling 10, it will be helpful to have an understanding of one way in which the new coupling 10 may be used. Referring to FIGS. 1 and 2, a generator 11 is driven by a prime mover 13 such as an internal combustion engine. Mechanical power is transmitted from the engine output shaft 15 to a flywheel 17 and thence to a ring-like transmission member 19 coupled to the flywheel 17.

The transmission member 19 has plural fingers 21 extending radially inwardly toward the axis of rotation 23. Measured circumferentially in degrees, the fingers 21 are spaced equidistant from one another. In a specific embodiment, there are eight fingers 21 and the angle of spacing between each adjacent pair of fingers 21 is 45°.

Figure 6:
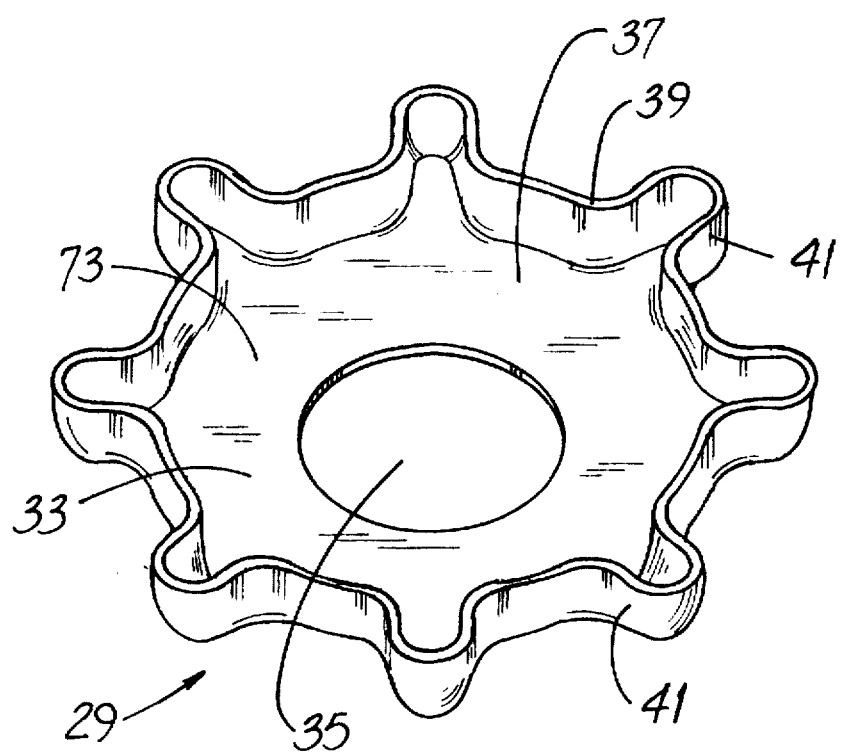
FIG. 6 is a perspective view of one of the components used to make the new coupling.

Referring next to FIGS. 2 through 6, the new power-transmitting coupling 10 includes a drive hub 25 having a central axis 27 and first and second coupling components 29, 31, respectively, mounted on the hub 25. In a highly preferred embodiment, the components 29, 31 are substantially identical to one another and one of them, e.g., component 29, is shown in FIG. 6. Each component 29, 31 is shaped to have a substantially planar body portion 33 with a central aperture 35. Each component 29, 31 is also shaped to have a concave interior cavity 37, an edge 39 around the cavity 37 and plural salients 41 extending radially outwardly. In a specific configuration, the number of salients 41 and the angle of spacing between adjacent pairs of salients 41 are, respectively, substantially equal to the number of fingers 21 and angle of spacing, e.g., 45° between fingers 21 of the transmission member 19.

Substantially all points along each component edge 39 are coincident with a plane 43 which is generally parallel to the body portion 33. When the components 29, 31 are attached to one another in edge-abutting relationship and when such components 29, 31 are also attached to the hub 25 (all shown in FIG. 4), the planes 43 defined by the edges 39 are substantially coincident with one another and substantially perpendicular to the central axis 27. And when the coupling 10 is used to transmit mechanical power, the axes 23 and 27 are coincident.

When the components 29, 31 are attached to one another and to the hub 25 to form the new coupling 10, the respective component salients 41 form radially-outwardly-extending projections 45, eight projections 45 in an exemplary embodiment. Each pair of projections 45 defines a notch 49 therebetween. The arc width AF of each finger 21 (about 5°) and the arc width AP of each projection 45 (about 8°) are each well less than the arc width AN of a notch 49 which is about 33°, all as measured from the axis of rotation 23 or the axis 27. The stated arc widths are exemplary; the arc widths of the fingers 21, the projections 45 and the notches 49 can vary considerably.

Figure 7:
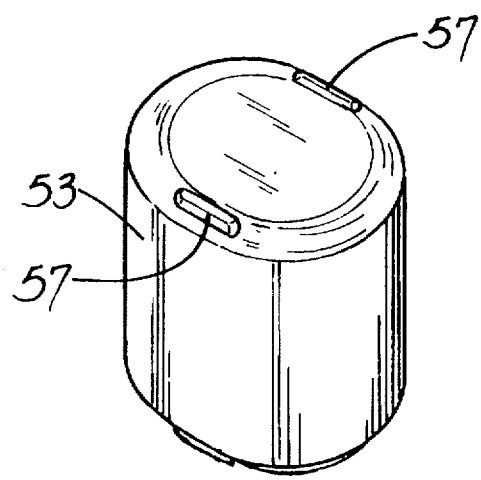
FIG. 7 is a perspective view of a resilient ovoid device used with the coupling and the transmission member shown in FIG. 2.
Figure 3:
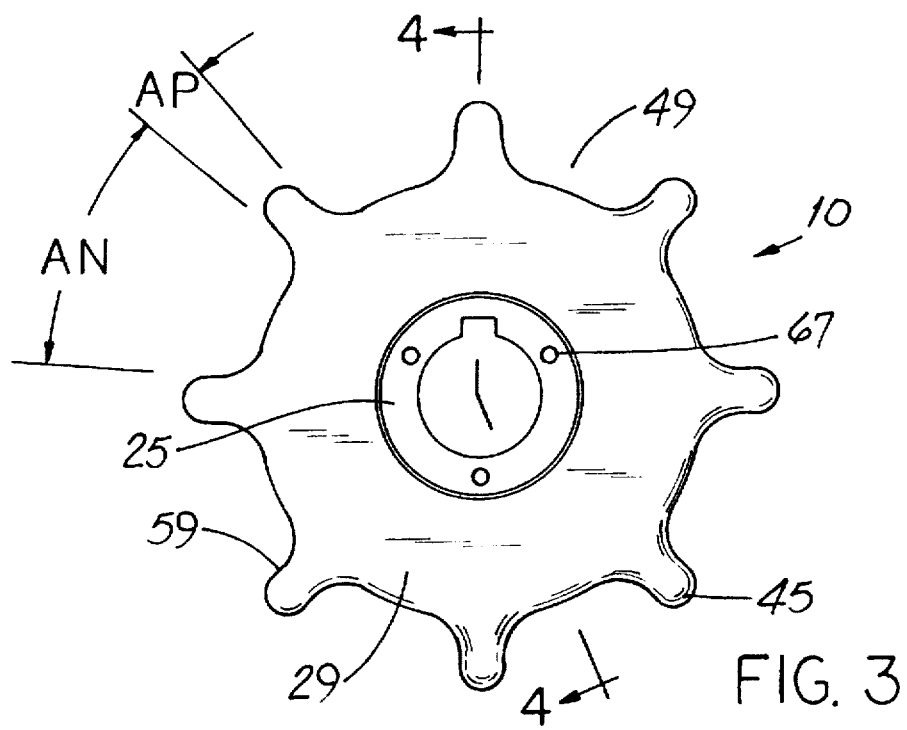
FIG. 3 is an elevation view of the new coupling.
Figure 4:
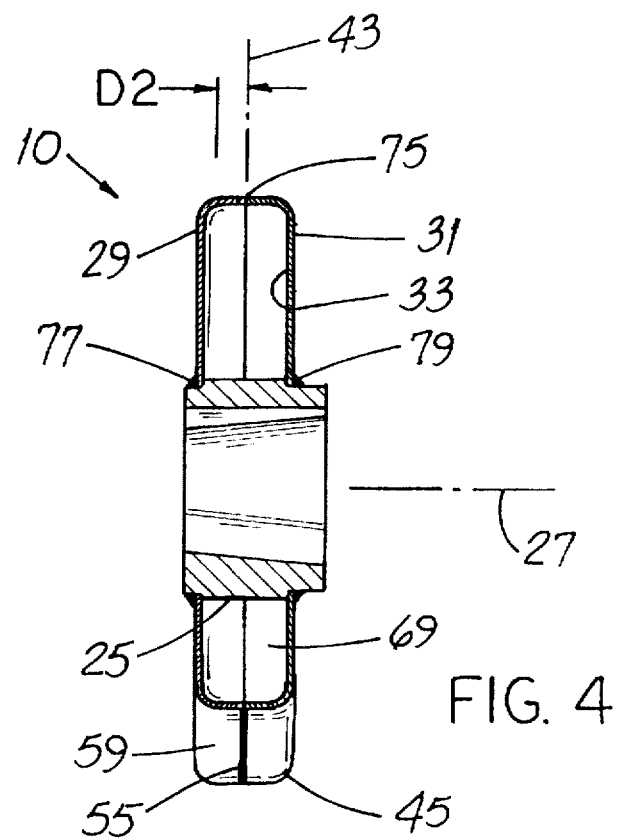
FIG. 4 is a sectional view of the new coupling taken along the section 4—4 of FIG. 3.

The new coupling 10 may be cooperatively configured with the transmission member 19 in such a way that the fingers 21 and projections 45 touch one another when such coupling 10 and member 19 are used for power transmission. However, in a highly preferred embodiment, a resilient ovoid device 53 (shown in FIGS. 2 and 7 and sometimes referred to as a "puck") is lodged between each finger 21 of the transmission member 19 and each projection 45 of the coupling 10 and contacts the TIG-applied weld material 55 described below. In that way, transmission of mechanical power from the transmission member 19 to the coupling 10 is cushioned when accelerating, running and retarding. To put it in other words, in a preferred embodiment there is no metal-to-metal contact between the transmission member 19 and the coupling 10.

A specific ovoid device 53 has a marker 57 used as a visual aid to properly orient the device 53 with respect to the coupling 10 when the coupling 10, devices 53 and transmission member 19 are being assembled. In a specific arrangement, the marker 57 is a line molded or otherwise formed in the device 53. When the coupling 10 is assembled with the transmission member 19 and the devices 53 are in place, the marker 57 most closely adjacent to a projection 45 is substantially parallel to the side surface 59 of such projection 45.

The drive hub 25 is configured to have reduced-area (and in a specific embodiment, reduced-diameter) first and second guide portions 61, 63, one such portion 61 or 63 at each end of the hub 25. Each guide portion 61, 63 terminates in an annular shoulder 65, the surface of which is generally perpendicular to the axis 27. At least at the junction of a shoulder 65 and the respective guide portion 61 or 63, respectively, the guide portion 61, or 63 and the aperture 35 of the component 29 or 31 fitted to the hub 25 have substantially the same shape and area. In a highly preferred embodiment, such shape is a circle.

In a preferred hub 25, one guide portion 63 is axially longer than the other portion 61. Such extra length permits chucking the hub 25 for final machining to clean up any hub distortion which may have occurred during welding. And a preferred hub 25 also has a plurality of threaded holes 67 to which may be attached a coupling pulling tool when removing the coupling 10 from a shaft. While the exemplary hub 25 is of the tapered, keyed type, such hub 25 may also be configured to accept a straight keyed shaft, a spline shaft or the like.

The new method for making a power-transmitting coupling 10 includes the steps of forming first and second coupling components 29, 31. Preferably, such components 29, 31 are formed using a press which cuts a scalloped-edge flat blank, cuts the aperture 35 in the blank and forms the blank to its concave shape (shown in FIG. 6). As necessary, the edge 39 around the cavity 37 is machined flat and parallel to the body portion 33. That is, the edge 39 is finished to define a plane 43 substantially parallel to the body portion 33 of that component 29 or 31.

Each component 29, 31 resembles a "half shell" and such components 29, 31 may be used interchangeably when making the coupling 10. Unlike a coupling 10 of a known type, the new coupling 10 is hollow in that it has an interior chamber 69. And such new coupling 10 is significantly lighter than its predecessor.

The components 29, 31 are supported in edge-contacting relationship to one another and then joined to one another. The supporting step includes assembling the components 29, 31 to the drive hub 25. A separate guide portion 61 or 63 is inserted through each of the respective apertures 35 of the coupling components 29, 31 and such components 29, 31 are urged toward one another until their edges 39 contact one another and the respective hub shoulders 65.

Another aspect of the new method involves certain dimensional relationships. The hub shoulders 65 are spaced by a first dimension D1 as measured along or parallel to the hub central axis 27. As to each component 29 or 31, the interior surface 73 of its body portion 33 and the plane 43 defined by the component edge 39 are spaced by what is termed a "depth dimension" D2. In a preferred method, the first dimension D1 is substantially equal to the total of the depth dimensions D2 of the two half-shell components 29, 31. And in a highly preferred method, the depth dimensions D2 of the components 29, 31 are substantially equal to one another.

When the components 29, 31 are supported with respect to the hub 25 and in a relationship to one another such that the components 29, 31 contact one another at the edges 39, the edges 39 form a weld path 75. The joining step includes welding along the weld path 75 and in a more specific aspect, also includes welding the components 29, 31 to the drive hub 25 by applying circumferential welds at the locations 77, 79.

Preferably, disparate types of welding are used to weld along the weld path 75 (thereby joining the components 29, 31 to one another) and to weld the components 29, 31 to the drive hub 25. Welding along the weld path 75 is by tungsten inert gas (TIG) welding while welding the components 29, 31 to the drive hub 25 is by applying metal inert gas (MIG) welding at circular locations 77, 79.

While the principles of the invention have been shown and described in connection with a few preferred embodiments, it is to be understood clearly that such embodiments are by way of example and are not limiting.

What is claimed:

1. A method for making a power-transmitting coupling including the steps of:
   providing a hub having first and second guide portions terminating in first and second shoulders, respectively;
   forming first and second coupling components to have (a) substantially planar first and second body portions, respectively, and (b) first and second edges, respectively;
   and wherein:
   the first and second edges define respective planes substantially parallel to the first and second body portions, respectively;
   and wherein the method includes:
   assembling the components and the drive hub to one another by urging the first and second components over the first and second guide portions, respectively, and against the first and second shoulders, respectively;
   welding the first and second body portions to the first and second guide portions, respectively, while retaining the edges in contact with one another; and
   joining the components to one another by welding along the contacting edges.

2. The method of claim 1 wherein step welding along the contacting edges includes applying tungsten inert gas welding along the contacting edges.

3. The method of claim 2 wherein the welding step is followed by assembling the coupling into a power transmission having at least one resilient device bearing against the contacting edges.

4. The method of claim 2 wherein the step of welding the first and second body portions includes applying metal inert gas welding.

5. The method of claim 1 wherein the step of welding the first and second body portions includes applying metal inert gas welding.

6. The method of claim 1 wherein:

the first and second shoulders spaced by a first dimension;

each coupling component is formed to have an interior surface;

as to each component, its interior surface and the plane defined by its edge are spaced by a depth dimension; and the first dimension is substantially equal to the total of the depth dimensions of the components.

7. The method of claim 6 wherein the depth dimensions of the components are substantially equal to one another.

8. A method for making a power-transmitting coupling including the steps of:

forming first and second coupling components including forming a central aperture in each coupling component;

supporting the components in edge-contacting relationship to one another by assembling the first and second components to, respectively, first and second guide portions of a drive hub by inserting the first and second guide portions through the respective apertures of the coupling components; and joining the components to one another;

and wherein:

the hub has first and second shoulders spaced by a first dimension;

each coupling component is formed to have an interior surface and an edge defining a plane;

as to each component, the surface and the plane are spaced by a depth dimension; and the first dimension is substantially equal to the total of the depth dimensions of the components.

9. The method of claim 8 wherein the depth dimensions of the components are substantially equal to one another.

10. A method for making a power-transmitting coupling including the steps of:

forming first and second coupling components, each component having an edge;

supporting the components in edge-contacting relationship to one another including assembling the components to a drive hub, the contacting edges thereby forming a weld path; and joining the components to one another; and wherein the joining step includes:

welding the components to the drive hub; and welding along the weld path.

* * * * *